(12) United States Patent
Mitchell (10) Patent No.: US 7,483,696 B1
(45) Date of Patent: Jan. 27, 2009

(54) CELLULAR WIRELESS NETWORK FOR PASSENGERS CABINS

(75) Inventor: James P. Mitchell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 766 days.

(21) Appl. No.: 10/998,517

(22) Filed: Nov. 29, 2004

(51) Int. Cl.
*H04Q 7/20* (2006.01)
(52) U.S. Cl. .................. 455/431; 455/427
(58) Field of Classification Search ............. 455/431, 455/427, 446, 447, 435.1
See application file for complete search history.

(56) References Cited

U.S. PATENT DOCUMENTS

| | | | |
|---|---|---|---|
| 6,580,915 B1 * | 6/2003 | Kroll | 455/456.3 |
| 6,614,126 B1 | 9/2003 | Mitchell | |
| 6,642,894 B1 * | 11/2003 | Gross et al. | 455/431 |
| 7,054,593 B2 * | 5/2006 | de La Chapelle et al. | 455/13.4 |
| 2002/0058477 A1 * | 5/2002 | de La Chapelle | 455/13.4 |
| 2002/0058478 A1 * | 5/2002 | de La Chapelle et al. | 455/13.4 |
| 2002/0160773 A1 * | 10/2002 | Gresham et al. | 455/431 |
| 2004/0147243 A1 * | 7/2004 | McKenna | 455/403 |
| 2004/0157664 A1 * | 8/2004 | Link | 463/43 |
| 2004/0204189 A1 * | 10/2004 | Guetre et al. | 455/575.1 |
| 2005/0020203 A1 * | 1/2005 | Losh et al. | 455/11.1 |
| 2005/0130744 A1 * | 6/2005 | Eck et al. | 463/43 |

OTHER PUBLICATIONS

Patent Application for "Method and Apparatus for High Availability Passenger Entertainment Content Delivery" by James P. Mitchell, U.S. Appl. No. 10/442,480, filed May 21, 2003.
Patent Application for "Configurable Cabin Antenna System and Placement Process" by James P. Mitchell and Fatma Ayhan Sakarya, U.S. Appl. No. 10/894,334, filed Jul. 19, 2004.

* cited by examiner

Primary Examiner—Dwayne D Bost
Assistant Examiner—Huy D Nguyen (57) ABSTRACT

A cellular wireless in-flight entertainment (IFE) system is used in an aircraft for delivering programming to passengers. A head end server provides data and programming to cells. Each cell comprises a wireless access point/configurable antenna to receive the data and the programming. The wireless access point/configurable antenna is disposed at an optimum location in a passenger cabin and operates with a predetermined frequency, radiation pattern, and polarization to provide the programming at optimum coverage. Wireless seat displays receive the programming from the wireless access point/configurable antenna and have a seat display antenna with selectable polarization. The cellular wireless IFE system provides for frequency reuse within the cells, registration of passengers upon log in to identify placement of the wireless seat displays, load balancing to prevent exceeding a capacity of a wireless access point/configurable antenna, and a scalable architecture where data and video each utilize a different band and wireless access point/configurable antenna.

38 Claims, 5 Drawing Sheets

CELLULAR WIRELESS NETWORK FOR PASSENGERS CABINS

CROSS REFERENCE TO RELATED APPLICATIONS

The present application is related to co-pending application Ser. No. 10/442480 filed on May 21, 2003 entitled "Method and Apparatus for High Availability Passenger Entertainment Content Delivery" by James P. Mitchell and Ser. No. 10/894,334 filed on Jul. 19, 2004 entitled "Configurable Cabin Antenna System and Placement Process" by James P. Mitchell and Fatma Ayhan Sakarya. The co-pending applications are assigned to the assignee of the present invention.

BACKGROUND OF THE INVENTION

The present invention relates to in-flight entertainment (IFE) systems and specifically to a cellular wireless network for aircraft passenger cabins.

In-flight entertainment systems have been installed on commercial airliners for a number of years. An in-flight entertainment system typically comprises the components necessary to present entertainment content to an airline passenger while in flight. Current IFE systems are wired systems that deliver programming to passengers similar to a cable television system. The current systems comprise head end equipment where programming and control functions originate, a distribution subsystem and display systems. The entertainment content is distributed from the head end equipment to passengers by means of the distribution system. The display system receives the content from the distribution system, processes the content and displays it to the airline passengers.

Current IFE systems are best installed as an aircraft is being built. Existing aircraft may have retrofit systems installed. However retrofitting an existing aircraft with new wiring and cables is difficult and expensive. In addition wired systems are heavy due to the amount of wiring required to connect all the seats in an aircraft, comprise a large number of line replaceable units (LRU) such as distribution box equipment and seat equipment, and consume large amounts of power due to the large number of LRUs. Having a large number of LRUs also reduces reliability and increases cost.

Wireless IFE distribution systems offer many advantages over wired systems in an aircraft cabin. Retrofit installations on existing aircraft are much easier to accomplish due to the elimination of wires and cables. Finding locations for the many LRUs such as seat equipment is not required in a wireless system. Weight and power reductions are easily achievable with a wireless distribution system. Fewer LRUs result in less maintenance, more flexibility in IFE system installations, increased reliability, and reduced costs.

Aircraft cabins offer a considerable design challenge when developing a wireless distribution system for an IFE system. Standard wireless RF networking in an aircraft cabin can be suboptimal due to uneven coverage. Due to very complex aircraft absorption and blockage factors a single antenna for the whole cabin has been found to be not practical. The aircraft cabin's unique half-section linear tube shape (longer than it is wide by a factor of 5:1 in some cases) requires a beam pattern from an antenna system that does not overemphasize lateral RF projection otherwise self interference of repeating bands used within the system may occur.

An IFE system can require megabits of individual channel capacity in order to maintain video and other data services. Commercial off-the-shelf (COTS) wireless local area network (LAN) access point systems used to serve personal electronic devices however are relatively band limited when considered to serve hundreds of passengers. COTS systems do not provide enough aggregate bandwidth to enable an entire cabin of hundreds of passengers each with their own unique bandwidth requirements.

A multiple antenna cellular network can be used with beam shaping to compensate for cabin geometry as well as for adjacent cell interference potential. Each multiband cell antenna within each physical access point as a system must be controllable to maximally cover multi-seat cell areas. Due to bandwidth limitations, RF bands must be reused to enable coverage within a large aircraft cabin. Since a cellular LAN system is wireless, passenger registration is uncertain and the system must therefore be able to register and locate passenger wireless seat displays. Registration or log in is needed to send protocols and data unique to each passenger wireless seat display. The cellular network must be scalable to fit most cabin configurations and passenger wireless needs and requires network load balancing to prevent poor video or audio quality due to overloading in a cell. Therefore a cabin cellular wireless system having a wireless network server system and a wireless access point and configurable antenna system meeting IFE requirements is needed.

SUMMARY OF THE INVENTION

A cellular wireless in-flight entertainment (IFE) system for use in an aircraft for delivering programming to passengers in a plurality of seats is disclosed. The cellular wireless network comprises a head end server for providing data and the programming. The cellular wireless network comprises a plurality of cells. Each cell comprises a wireless access point/configurable antenna connected to the head end server to receive the data and the programming. The wireless access point/configurable antenna is disposed at an optimum selected location in the passenger cabin, operates at a predetermined repeatable frequency, and has a predetermined radiation pattern and a predetermined polarization to provide the programming at optimum coverage. Each cell further comprises one or more wireless seat displays located in the plurality of seats for receiving the programming from the wireless access point/configurable antenna system.

The optimum selected location of the wireless access point/configurable antenna is determined by measuring RF power level and fade data at the plurality of seats and the wireless access point/configurable antenna is installed in the optimum selected locations and antenna beams are adjusted in accordance with RF power level and fade data.

The head end server sends commands to the wireless access point/configurable antenna to make fine beam position adjustments based on a summary computation that considers minimum performance requirements to all cells in the plurality of cells and to maximize data rate to a cell.

In the cellular wireless IFE system the plurality of cells is disposed along sides of the aircraft cabin at predetermined points within the aircraft cabin to provide optimum coverage to the seats in the plurality seats within a cell. A first group of cells in the plurality of cells operates at a first set of frequencies and a second group of cells in the plurality of cells separated longitudinally from and on a same side of the aircraft cabin as the first group of cells repeats the first set of frequencies of the first group of cells. A third group of cells in the plurality of cells on an opposite side of the aircraft cabin from the first and second group operates at a second set of frequencies and a fourth group of cells in the plurality of cells separated longitudinally from and on a same side of the aircraft cabin as the third group of cells repeats the second set of frequencies of the third group.

The wireless access point/configurable antenna and a seat display antenna have a same polarization and alternating polarization is used between adjacent cells in the plurality of cells.

The cellular wireless IFE system provides for registration wherein a passenger logs in to identify placement of the wireless seat display at an identified seat within the plurality of seats. The wireless seat display generates and sends a control protocol message over control and data lines. The control protocol message has a position location number associated with the identified seat. The head end server receives the position location number associated with the identified seat and reads the seat number and re-assigns a communications channel of the wireless seat display located with the identified seat to tune to a best coverage wireless access point/configurable antenna located in the aircraft near the passenger wireless seat display. The head end server tunes a wireless radio and selects an antenna in the wireless seat display at the identified seat.

The cellular wireless IFE system provides for load balancing when a capacity of a wireless access point/configurable antenna is exceeded using a manual system. The cellular wireless IFE system balances a load on the wireless access point/configurable antenna by switching at least one wireless seat display to another wireless access point/configurable antenna. A passenger logs in to identify placement of the wireless seat display at an identified seat receiving programming from the wireless access point/configurable that is overloaded. The wireless seat display generates and sends a control protocol message over control and data lines to switch the wireless seat display. The control protocol message has a position location number associated with the identified seat. The head end server receives the position location number associated with the identified seat, reads the seat number and re-assigns a communications channel of the wireless seat display located with the identified seat to tune to the other wireless access point/configurable antenna located in the aircraft cabin near the passenger wireless seat display. The head end server tunes a wireless radio and selects an antenna in the wireless seat display.

The cellular wireless IFE system provides for load balancing when a capacity of a wireless access point/configurable antenna is exceeded by using an automatic system. When the capacity of the wireless access point/configurable antenna is exceeded the cellular wireless IFE system balances a load on the wireless access point/configurable antenna by switching at least one wireless seat display to another wireless access point/configurable antenna. A position location system producing a ranging signal is used. When the wireless seat display receives the ranging signals, the seat display relays a unique position location back to the head end server on a temporarily assigned RF channel through the wireless access point/configurable antenna. The head end server assigns the other wireless access point/configurable antenna and RF channel for video programming to the wireless seat display. The wireless seat display tunes to a band on the other wireless access point/configurable antenna.

The cellular wireless IFE system provides a scalable architecture for data and video programming services whereby each service utilizes a different RF band and each service further utilizes a different wireless access point/configurable antenna. A protocol to select and control a wireless access point/configurable antenna includes the selection of the data and programming services.

It is an object of the present invention to provide a cellular wireless IFE system having wireless access point/configurable antennas in a cellular architecture to maximize wireless connectivity of each seat within an aircraft cabin.

It is an object of the present invention to maximize wireless connectivity of each seat within an aircraft cabin while reusing frequencies.

It is an advantage of the present invention to provide a tiered scalable system to deliver desired programming and data to passengers with maximized connectivity.

It is an advantage of the present invention to provide a passenger log in/registration system that provides desired data and programming at maximize connectivity using a simplified procedure.

It is an advantage of the present invention to provide load balancing to prevent overloading a wireless access point/configurable antenna to deliver optimum quality video and data to passengers.

It is a feature of the present invention to use alternating polarity on wireless access point/configurable antennas and wireless seat displays to reduce adjacent cell interference.

It is a feature of the present invention to provide a cellular wireless IFE system with reduced numbers of interconnect wires and cables.

BRIEF DESCRIPTION OF THE DRAWINGS

The invention may be more fully understood by reading the following description of the preferred embodiments of the invention in conjunction with the appended drawings wherein.

DETAILED DESCRIPTION

The invention described herein is for a cellular wireless in-flight entertainment (IFE) and data distribution system. The invention may use a cellular topology for 802.11 a, b, g WiFi access points in an aircraft cabin. The present invention discloses a tiered scalable service for e-mail, voice over IP, Internet, video, and live TV delivery to wireless personal electronic devices (PED) and to wireless seat displays. The invention further includes a configurable directional antenna system for optimum cabin cell coverage, maximum flight deck protection and repeatable frequency cells supporting scalable wireless network topology. The configurable antenna enables fewer interconnecting cables and wires by directing each radio band to certain cabin areas from a fixed physical location in the aircraft ceiling or wall. An electrical beam-steered antenna is used for each configurable directional antenna in the cabin. RF phases to each active antenna element are selected by a system head end server to achieve desired beam coverage. Phases may be adjusted from the system head end server via a network cable and through computing devices attached to the network cable. A feedback method during installation automatically adjusts the antenna beams for optimum coverage and performance.

Figure 1:
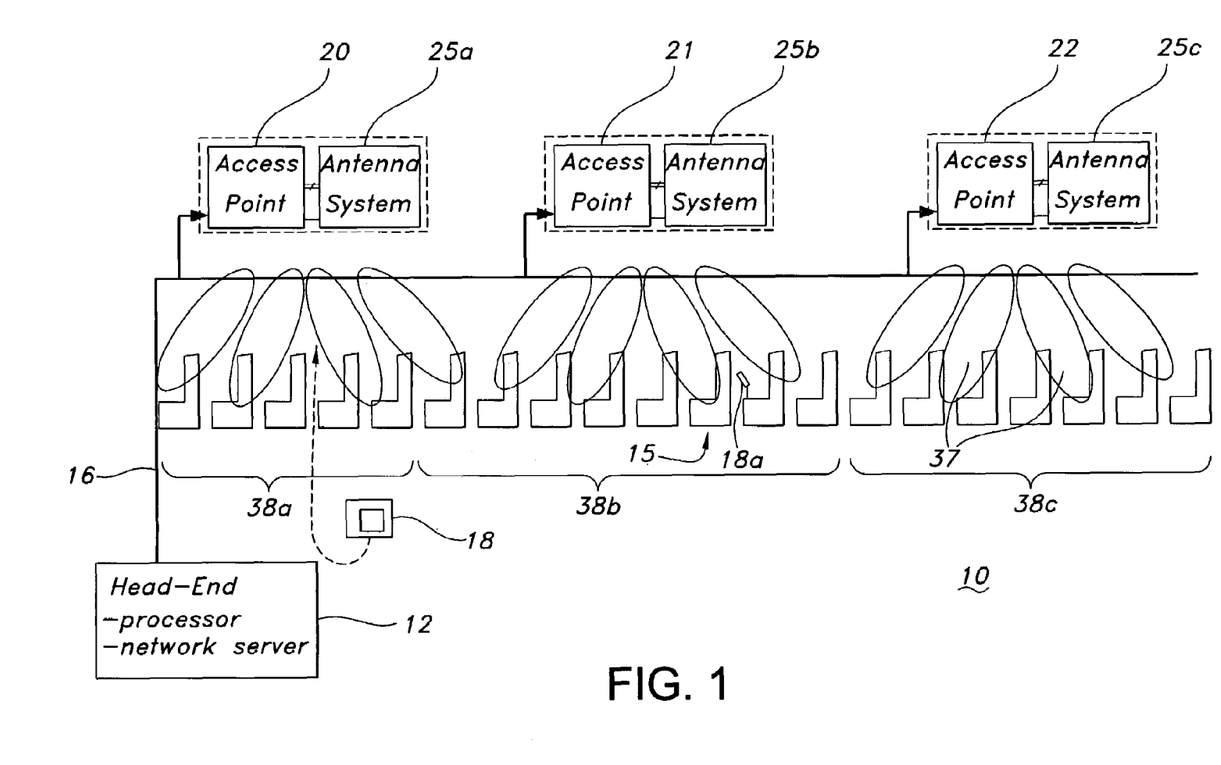
FIG. 1 is a block diagram of a cellular wireless IFE system of the present invention.

FIG. 1 is a simplified block diagram of a cellular wireless IFE distribution system 10 of the present invention. In FIG. 1 a head-end server 12 provides system control data and programming and data such as stored video, live video, aircraft intranet, Internet, e-mail, etc. to passengers (not shown) in seats 15 within an aircraft cabin. The system 10 shown in FIG. 1 may also be used to deliver data to flight deck areas such as an aircraft cockpit (not shown). The head end server 12 is connected to wireless access points 20, 21, and 22 and corresponding configurable antenna systems 25a-c with control and data lines 16. Each wireless access point 20-22 serves a cell 38a, 38b, and 38c. While three wireless access points 20-22, configurable antenna systems 25a-c, and cells 38a-c are shown in FIG. 1, the number can be more or less depending on aircraft size and coverage requirements. The cellular wireless IFE distribution system 10 in FIG. 1 has the configurable antenna systems 25a-c installed with the wireless access points 20-22 in the ceiling above a cabin aisle, under a baggage bin, with a passenger lighting and environmental control assembly, or any other location within the passenger cabin or the aircraft flight deck (not shown) to provide needed signal coverage. Beams 37 radiated from configurable antenna systems 25a-c are shown in exemplary fashion with four beams from each configurable antenna system 25a-c giving coverage to a group of seats or a cell 38a-c within a plurality of seats 15. Wireless access points 20-22 may be grouped such that a single installation location may contain a plurality of radios on several bands and the aircraft may contain several of these groups in an aircraft cabin. If a wireless access point group has three radios then the configurable antenna system 25 may have three independent antenna beams.

Wireless access points 20, 21, and 22 may be commercial off-the-shelf (COTS) wireless devices available from a wide variety of manufacturers. Wireless access points 20, 21, and 22 support IEEE 802.11a, 802.11b, 802.11g, and 802.11n wireless standards. Configurable antennas 25a-c located with or within the wireless access points 20, 21, and 22 transmit data to passengers in seats 15 in the aircraft cabin. The configurable antennas 25a-c may also be used to receive data from passengers in seats 15 in the form or Internet requests, e-mail messages, passenger log ins, etc. The passengers may have wireless personnel electronic devices (PED) 18 that are carried on the aircraft or supplied by the airline to receive data and programming from wireless access points 20, 21, and 22. Fixed wireless seat displays 18a may also be installed in the aircraft cabin. Only one PED 18 and seat display 18a are shown in FIG. 1 but any number of passengers may have a PED 18 and wireless seat display 18a. The PED 18 may be a laptop personal computer (PC) with a wireless card that supports IEEE 802.11a, b, g, and n operation to transmit and receive data and has a compatible media player. The location of wireless access points 20, 21, and 22 can move within the aircraft cabin to provide optimum coverage to groups of seats 15 in cells 38a-c.

Figure 2:
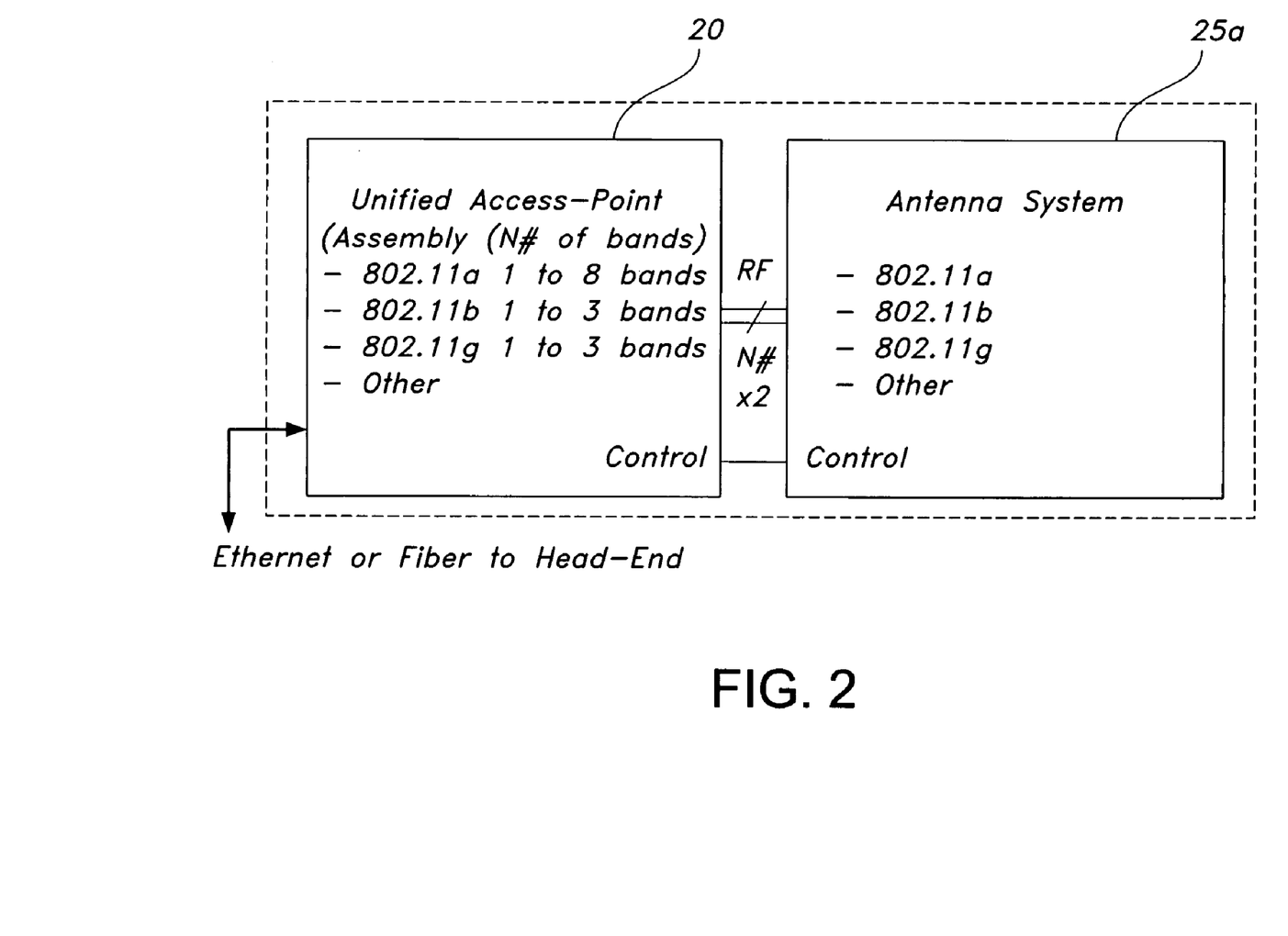
FIG. 2 shows a wireless access point connected to a custom configurable antenna used in the present invention.

COTS wireless access points typically have omni directional antennas. To avoid interference and coverage problems in an aircraft cabin a custom antenna for each cabin location can be designed and installed but this is complicated and expensive with a wide variety of aircraft and seating configurations. With the cellular wireless IFE system 10 of the present invention, the wireless access points 20-22 are connected to the configurable antenna systems 25a-c. FIG. 2 shows the connection of wireless access point 20 to configurable antenna 25a. The configurable antenna systems 25a-c enable a plurality of separate beams and frequency bands from each cabin mounted wireless access point 20, 21, and 22, thereby minimizing cabin hardware and mitigating interference from adjacent wireless access points when reusing the same RF bands or sub-bands. The configurable antenna system 25a-c are capable of transmission and reception of IEEE 802.11a, b, g, and n signals and potentially other future wireless standard or proprietary signals.

The configurable antenna systems 25a-c may be any type of beam controllable antenna known in the art such as an analog or digital phased array, a mechanically or electronically switched array, a hybrid RF switched array (combination of mechanical and electronic switching), etc. An exemplary version of the configurable antenna system 25 is shown in detail FIG. 3 as a phased array antenna with five radiation elements 33. The radiation elements 33 may be ¼ wavelength elements and more or less radiation elements than five may be used. Control data is received in control function 32 from the head end server 12 over control and data lines 16. An RF signal is received from a receiver/transmitter 36 within each the wireless access point 20, 21, and 22 for radiation by the configurable antenna system 25. The control function 32 provides programmable element attenuation control to attenuators 34 to vary the transmit signal level and programmable element phase control to phase shifters 35 to vary the signal phase thereby steering the radiated beam of the configurable antenna system 25. Separate transmit and receive antenna elements and respective controls (not shown) may be used.

Figure 3:
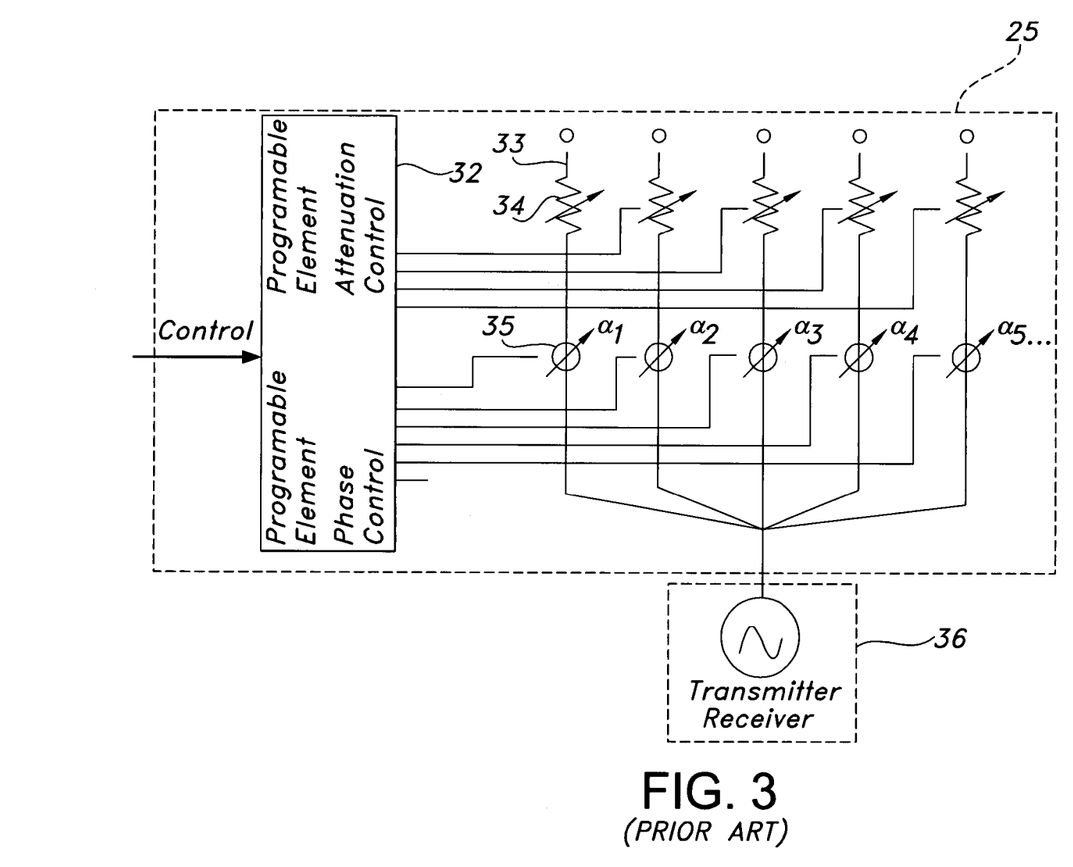
FIG. 3 is a diagram of a configurable antenna implemented as a phased array that may be used in the present invention with the wireless access points of FIG. 2.

Polarization switching between horizontal, vertical, right hand circular, left hand circular, etc. of the configurable antenna system 25 may also be employed by switching radiation elements 33 in FIG. 3 to different orientations or switching in different radiation elements (not shown) having a desired polarization. The polarity of the configurable antenna system 25a-c is matched for each intended cell 38a-c or fixed wireless seat display 18a therein. The fixed wireless seat display 18a enables the use of polarity switching while a wireless carry-on PED 18 does not due to the mobility of the PED 18.

Figure 4:
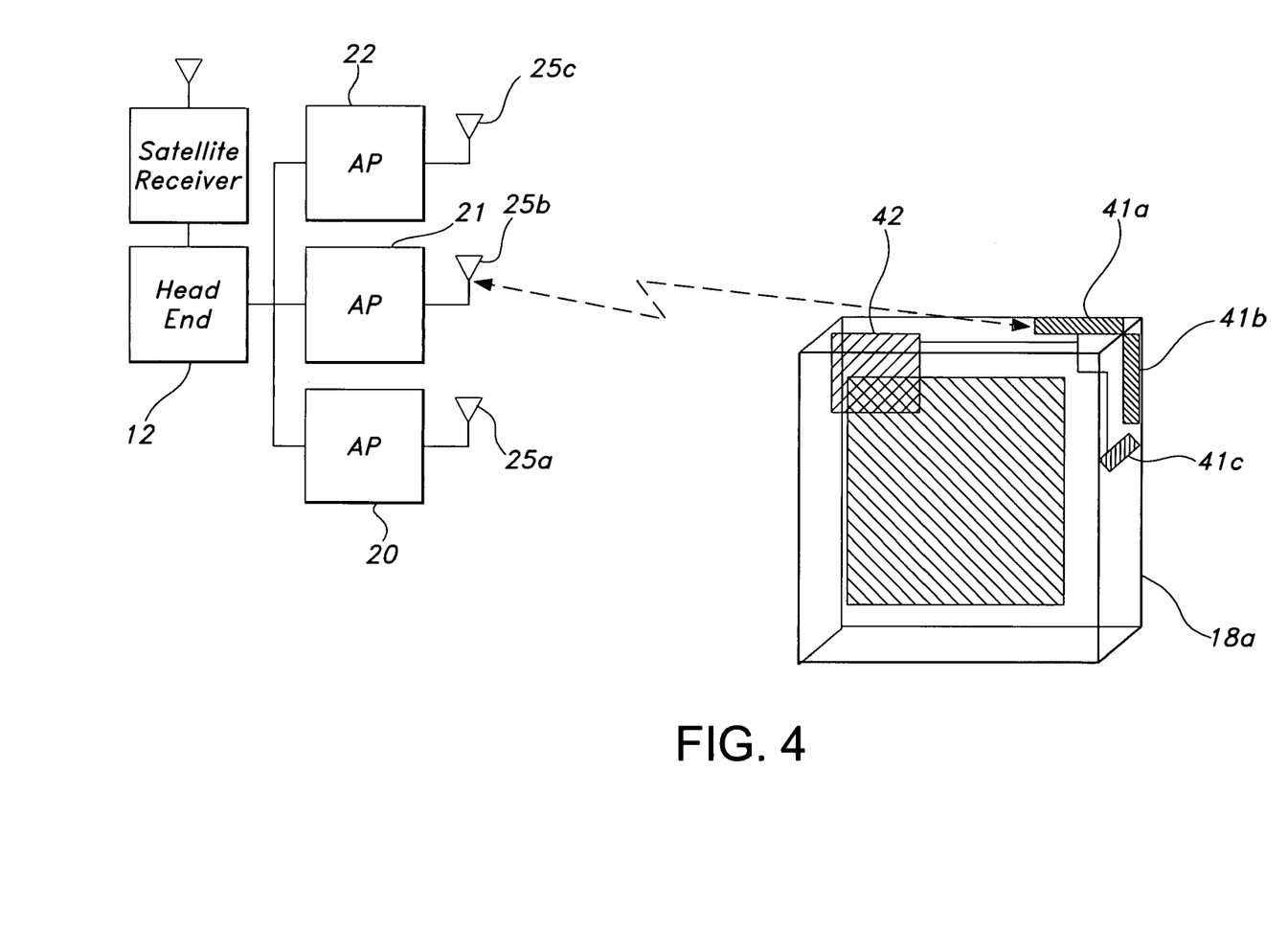
FIG. 4 is a simplified diagram of the cellular wireless IFE system of FIG. 1 showing a head end server, wireless access points, antenna systems, and a wireless seat display.

The use of alternating antenna polarization between each wireless access point 20-22 and associated configurable antenna system 25a-c and each fixed wireless system in a seat display 18a within each cell 38a-c covering a group of seats 15 may be used to assist in interference rejection between adjacent cells within the aircraft cabin. FIG. 4 is a simplified diagram showing the head end server 12, wireless access points 20-22, configurable antenna systems 25a-c, and a single seat display 18a. A seat display 18a within cells 38a-c that the wireless access points 20-22 are intended to serve also may use matched polarization antennas 41a-c as shown in FIG. 4. The seat antennas 41a-c are connected to a wireless radio 42 in the seat display 18a or in the seat 15 itself for IEEE 802.11a, b, g, n. There may be a switch (not shown) to select antenna polarity on the seat display 18a in each seat 15. Programmable means may be used to select the polarity of the wireless access point 20-22 configurable antennas 25a-c. Adjacent wireless access points can be configured to alternate polarization by means of manual selection or by remote control over the wireless access point control and data bus 16. Seat antennas 41a-c may include directional ground planes to direct the beam in the direction of the wireless access points.

Antenna beams 37 from the configurable antenna systems 25a-c are controlled by an algorithm that may be performed by any computing device in the system 10 such as the head end server 12 or a wireless PED 18 having proper authorization. The algorithm adjusts the beams 37 to be directed to designate seating areas or cells 38a-c with some precision.

The algorithm may use bit-error rate (BER) or frame error rate (FER) or any other appropriate data transmission statistic collected when test data is transmitted and fed back from the wireless PED 18 or wireless seat display 18a located in the seats 15 and using the wireless access point 20-22 and associated configurable antenna systems 25a-c. By using system BER or FER loop-back test methods, an optimal antenna beam 37 position is computed to configure newly installed wireless access points 20-22 and configurable antenna systems 25a-c. The configurable antenna systems 25a-c are beam steerable to fine tune area coverage to the several cabin cells 38a-c. Additionally access point power level may be measured and adjusted to minimize adjacent same RF band cell interference.

The co-pending application 04CR083/KE, Ser. No. 10/894,334, incorporated by reference in its entirety discloses a configurable antenna system placement process for locating the configurable antenna systems 25a-c and wireless access points 20-22 in an aircraft in such locations as cabin and flight deck areas. The co-pending application enables placement and calibration of a plurality of separate antenna beams 37 and frequency bands from each aircraft mounted configurable antenna system 25a-c and wireless access point 20-22 thereby minimizing the amount of aircraft hardware and mitigating interference from adjacent configurable antenna systems and wireless access points reusing the same RF bands or sub-bands while maximizing connectivity performance to each seat 15 within the aircraft. The described invention in the co-pending application serves to reduce installation time of configurable antenna systems 25a-c and wireless access points 20-22 within the aircraft. Once the wireless system 10 is deployed, each wireless PED 18 or wireless seat display 18a becomes part of a permanent process of measuring bit-error-rate in the seat area or cells 38a-c. Data collected by the cellular wireless system 10 head end 12, PED 18, or wireless seat display 18a may be processed and made available through a diagnostics interface. The cellular wireless system 10 continuously monitors itself while in use and information collected may be used to make future adjustments to power, antenna selection, and antenna beam direction. Information may also be used to realign the wireless access points 20-22 and configurable antenna systems 25a-c physically.

Figure 5:
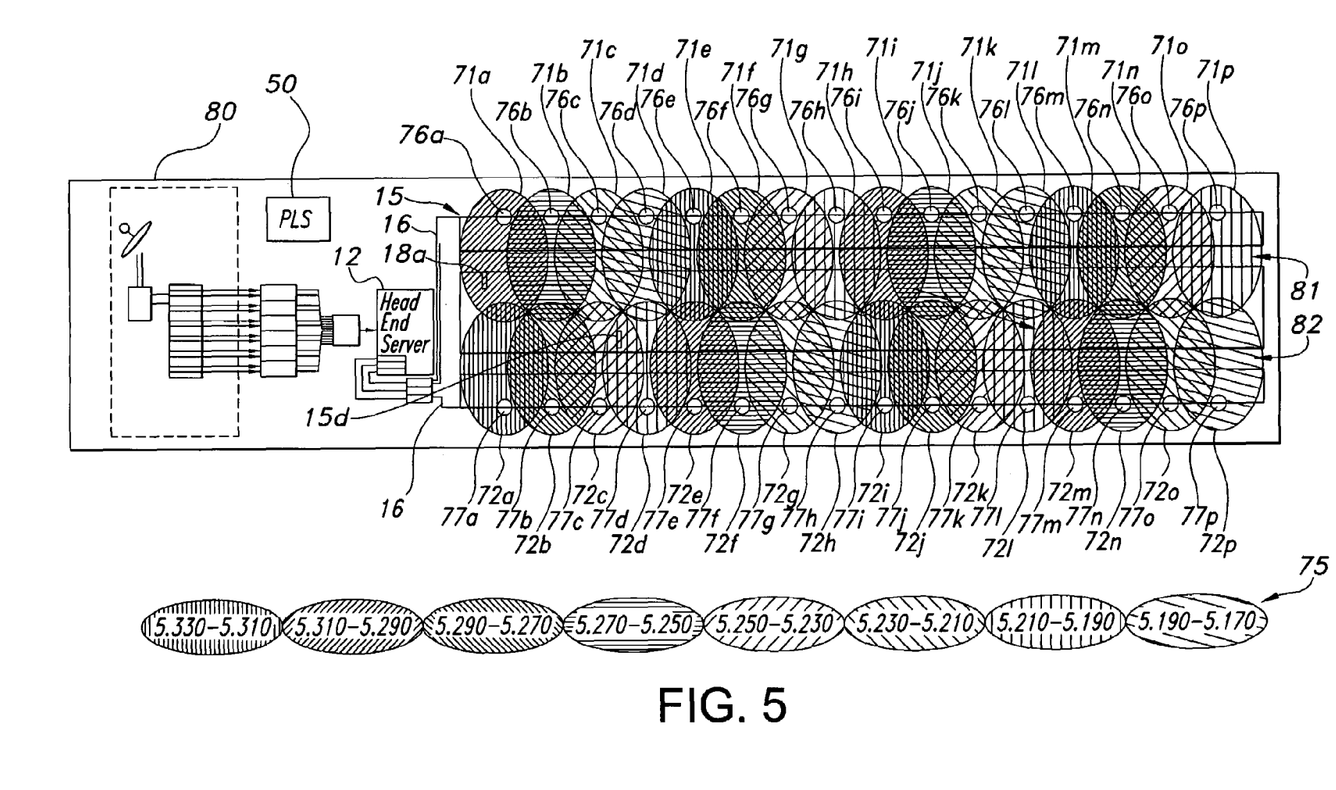
FIG. 5 shows the cellular wireless IFE system of FIG. 1 as installed in an aircraft cabin with twin aisles.

FIG. 5 shows the cellular wireless IFE system 10 of the present invention as installed in an aircraft 80 with twin aisles 81 and 82 in exemplary fashion. In FIG. 5, wireless access points 20-22 and associated configurable antennas 25a-c are shown as combinations 76 and 77 and may be disposed longitudinally and along the outside seating sections (seating areas near the windows) of the aircraft 80 to form a plurality of cells 71, 72. U.S. Pat. No. 6,614,126, Integrated Lighting and Data Communications Apparatus, by James P. Mitchell assigned to the assignee of the present invention and incorporated by reference discloses an apparatus to wirelessly transmit data to passenger seats. The wireless access points and configurable antennas 76, 77 are capable of each providing connectivity to approximately 15 seats to the left and right side seating areas and a portion of the mid-section seating area of the aircraft 80 with their associated beams to cover cells 71a-p and 72a-p. Cells 71a-h in a first group operate on a first set of frequencies as shown by the legend ovals 75 in FIG. 5. The frequencies repeat starting at cell 71i through 71p in a second group to conserve frequency usage while minimizing adjacent cell interference. Cells 72a-h in a third group operate at a second set of frequencies offset in frequency from cells 71a-h in the first group and repeat starting at cell 72i in a fourth group to minimize adjacent cell interference. Other frequencies and distribution of operating frequencies may be used. In addition to using different frequencies for each of the cells, antenna polarization may be used to minimize adjacent channel interference. For example cell 71a may use a first (vertical) polarization while cell 71b and 72a may use a second (horizontal) polarization. The seat antennas 41 in wireless seat displays 18a in cell 71a are made horizontal thereby matching the wireless access point/configurable antenna combination 76a; the seat antennas 41 in cell 72a are vertical, matching the wireless access point/configurable antenna combination 77a. The polarization may also be optionally alternated within a cell 71a-p and 72a-p to avoid intermodulation with adjacent wireless access point/configurable antennas 76 and 77. The antennas in the adjacent cell are made to alternate opposite of the first and subsequent cells. Polarization selection may be configurable by sending commands from the head end server 12 or an authorized test receiver (not shown) in the aircraft 80 cabin.

Wireless access point/configurable antennas 76, 77 placed adjacent to one another in the aircraft 80 cabin (left and right side) may also be potentially capable of serving an entire cross-section of the aircraft 80 at a level of service and may be further improved if sufficient power adjustments are made by the cellular wireless system 10 and wireless access point/configurable antennas 76, 77.

The cellular wireless IFE system 10 of the present invention, shown in FIG. 5, utilizes a unique control protocol between the head end server 12 and the wireless seat displays 18a in the aircraft 80 cabin to achieve flexibility enabling cabin network scalability. Scalability is the ability of the system 10 to provide a desired level of program or data delivery to passengers such as e-mail, Internet, or video using a minimum amount of bandwidth while not overloading wireless access point/configurable antennas 76, 77.

The control protocol of the cellular wireless IFE system 10 includes scalability for such services as e-mail, Internet, and video as variables, each service utilizing a different RF band or channel and each utilizing different wireless access point/configurable antennas 76, 77. The protocol to select and control a wireless access point/configurable antenna 76, 77 also may drive the selection of services. As an example, several bands may be used (802.11a in the 5-GHz band at 54 Mbps and b and g in the 2.4-GHz band at 11 Mbps and 54 Mbps respectively) and a different wireless access point/configurable antenna 76, 77 may be assigned to each application (e-mail, Internet, video).

The cellular wireless IFE system 10 employing various wireless services (e.g. video and data) must have order to its topology and network architecture, and data traffic to prevent congestion. While small delays in packet arrival in data messages, Internet etc. are generally not noticeable, small packet delays in video can be very detrimental to the video quality at a wireless seat display 18a. The cellular wireless IFE system 10 must have the ability to maintain a minimum quality of service for video streams, particularly with streams associated with broadcast video sources having little or no ability to perform a packet rebroadcast or correction.

The cellular wireless IFE system 10 in FIG. 5 employs a scalable or multi-level architecture, with each individual wireless network system uniquely serving as an incremental network application capability. By physically separating the data traffic (Internet, E-mail, SMS etc.) from the video traffic on separate wireless access point/configurable antennas 76, 77, higher capacities on the wireless video network may be achieved without being perturbed by the random burst nature of data being shared on the same network.

As an example, the cellular wireless IFE system 10 may be split into two networks to prevent video corruption. Data and Internet may use 802.11b at 11 Mbps on one wireless access point/configurable antenna 76, 77 and video on demand may use 802.11a at 54 Mbps on another wireless access point/configurable antenna 76, 77. The cellular wireless IFE system 10 is a scalable system where an aircraft may choose any network or both and maintain robust video.

It is noted that there is a unique balance between several variables including the arbitrary seating geometry of the aircraft cabin, the large number of passengers per cell, the limited capability of a 54-Mbps 802.11a wireless access point/configurable antenna 76, 77 and the ability to beam form antennas, that determines this scalable architecture as one that may be used to deliver video, Internet and data to the cabin without the need for additional RF bands.

Each of the bands used with the cellular wireless IFE system 10 that serve wireless technologies such as 802.11a, b, g, etc. have different qualities including channel bandwidths. For example, while the 802.11b standard used commonly in the 2.4 GHz band, and occupying 83.5 MHz, may support up to 11 Mbps for each of its three channels under good conditions, however it is not capable of supporting a sufficient number of MPEG-4 1-Mbps video streams to simultaneously serve 100s of passengers in the aircraft cabin. Even though cellular re-use of the three 2.4 GHz ISM bands is a possibility, control of re-used RF bands from each wireless access point/configurable antenna 76, 77 is not practical given the required small separation between units. Given this situation, 802.11b may be best assigned as a data link to fixed wireless seat displays 18a and PEDs 18.

The cellular wireless IFE distribution system 10 of the present invention provides for a passenger log-in/registration procedure at the wireless seat display 18a to identify placement of a seat display 18a at a seat 15D within the cabin. The passenger enters an aisle number, seat number, or clicks on a cabin zone graphic on the wireless seat display 18a to indicate his or her position in the cabin. A control protocol message from the wireless seat display 18a is sent to an wireless access point/configurable antenna 76, 77 and then over control and data lines 16 to the head end server 12. This message supplies a fixed hard-coded position-location number associated with each identified seat, such as seat 15D in FIG. 5. The head end server 12 reads the seat number 15D and computes/re-assigns a communications channel of the wireless seat display 18a located with the identified seat 15D. The aisle number, seat number, or zone location enables the head end server 12 or the wireless seat display 18a itself to direct its 802.11a, b, g wireless radio 42 and antennas 41a-c (see FIG. 4) to tune to the best coverage wireless access point/configurable antenna 76, 77 regionally located in the aircraft near the passenger seat display 18a at identified seat 15D. This procedure uniquely improves performance of a media session to the passenger, as the passenger in identified seat 15D is then linked to the nearest wireless access point/configurable antenna 76, 77 in their cell 71, 72 and reduces delays associated with radio scanning. This functionality means that the cell coverage shown in FIG. 5 changes with some cells 71, 72 becoming smaller and some seats 15 are receiving programming from cells further away.

The wireless head end server 12, using any frequency band, may query and interpret the wireless seat display 18a seating code and assign an antenna control code to select an antenna 41a-c in the wireless seat display 18a to optimally use the geometric conditions between wireless access point/configurable antennas 76 and 77 and the wireless display 18a. The control protocol message from the head end server 12 to the wireless seat display 18a selects one of the antennas 41a-c within the wireless seat display 18a (see FIG. 4) based on the identified seat 15D position relative to a desired wireless access point/configurable antenna 76, 77 such as 77c. The control protocol between the wireless head end server 12 and the wireless seat display 18a may also include a calculated antenna beam 37 position (see FIG. 1) and polarization control code for the selected wireless access point 77c best suited to reject other same-band wireless access point/configurable antennas 76, 77 in the cabin.

The cellular wireless distribution system 10 may accept certain seat numbers for a given wireless access point/configurable antenna 76, 77 and an RF band, balancing a potential network load over any region of the cabin to not exceed the capability of each wireless access point/configurable antenna 76, 77 band channel. A wireless access point/configurable antenna 76, 77 in FIG. 5 can become overused by serving too many passengers in seats 15. A wireless seat display 18a may link to a wireless access point/configurable antenna 76, 77 other than the one it is normally connected to when with such situations as a temporary blockage by a passenger. For example, a wireless seat display 18a at any of the seats 15 located in cells 72a-72e may link to any of the wireless access point/configurable antennas 77a-72e. If too many of the wireless seat displays 18a link to one wireless access point/configurable antenna such as 77c in cell 72c, this may lead to poor video quality at the wireless seat displays 18a within cell 72c.

Delivery of video content generally taxes the cellular wireless IFE system 10 significantly, making it possible to easily overload a wireless access point/configurable antenna 76, 77 having already near maximum utilization. Poor quality video delivery can result due to over allocated use, inducing latencies and resulting in latencies that in turn produce undesired macro block errors that can be seen in the wireless seat display 18a video application or the effects from video code/decoder starvation.

Because the cellular system 10 is wireless, there is no apparent way to guarantee a walk-on client device such as PED 18 (see FIG. 1) to a particular cell 71, 72 operating on same reused frequencies. Reliance on signal strength will not guarantee affiliation as the cabin produces RF fades and blockage. Dynamic propagation situations can cause a wireless client PED 18 to affiliate with a remote cell (access point) rather than a more local cell (access point) thereby adding to a load balance problem.

A limit on the number of passengers in seats 15 on a wireless accent point/configurable antenna 76a is needed when several wireless access point/configurable antennas 76, 77 are available on the aircraft 80. To complicate matters the wireless access point frequencies need to be reused by having wireless access point/configurable antennas 76, 77 using the same band be only separated by distance but still having a problem of being within the same RF level to a single seat such as 15D. If a particular wireless access point/configurable antenna 76, 77 becomes fully loaded, another local wireless access point/configurable antenna is selected.

Each wireless access point/configurable antenna 76, 77 on the aircraft 80 in FIG. 5 is authorized to establish connection with a wireless seat display 18a at a seat 15 within a pre-specified area of the aircraft cabin 80 or group of seats 15 within a cell 71, 72. The wireless seat display 18a provides seat information such as seat number 15D as one option as discussed above for passenger log-in or the wireless seat display 18a maybe located by the head end server 12 by using a RF ranging system that may include the wireless access point/configurable antenna 76, 77 itself for this operation or any other ranging or position location method (e.g. UWB, etc.) embedded as part of the seat display 18a. The RF ranging system may also be used for passenger log-in.

With a manual system and method to produce an orderly load balance a wireless seat display 18a establishes temporary connection with a wireless access point/configurable antenna 76, 77 on a band. The passenger enters cabin position such as seat 15D into the wireless seat display 18a that is then communicated back to the wireless access point/configurable antenna 76, 77 and head end server 12. The head end server 12 commands the wireless seat display 18a to automatically or manually tune to nearest calculated wireless access point/configurable antenna 76, 77 by providing band information for the wireless seat display 18a to tune to.

With an automatic protocol system to produce load balancing and passenger log-in, the aircraft cabin has a position location system (PLS) 50 in FIG. 5 using UWB (ultra wide band) that produces a ranging signal. Alternatively, one of the wireless access point/configurable antennas 76, 77 may be used to transmit the ranging signal. The ranging signals are captured by a wireless seat display 18a or PED 18 such as a PC laptop radio WiFi or UWB. UWB technology is noted for its precision timing capability enabling it to be considered in high-accuracy ranging systems. The seat display 18a or PED 18 relays a unique position location back to the head end server 12 on a temporarily assigned RF channel through a wireless access point/configurable antenna 76, 77. The head end server 12 assigns another wireless access point/configurable antenna 76, 77 and RF channel for video programming. The wireless seat display 18a or PED 18 accepts control and tunes to a band on the other wireless access point/configurable antenna 76, 77 on a frequency having adequate resources (not overloaded).

It is believed that the cellular wireless IFE distribution system 10 of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A cellular wireless in-flight entertainment (IFE) system for use in an aircraft for delivering data and programming to passengers in a plurality of seats said cellular wireless network comprising:
   a head end server for providing the data and the programming;
   a plurality of cells each of said cells comprising:
   a wireless access point/configurable antenna connected to the head end server to receive the data and the programming said wireless access point/configurable antenna disposed at an optimum selected location in a passenger cabin, operating at a predetermined repeatable frequency, and having a predetermined radiation pattern and a predetermined polarization to provide the programming; and
   one or more wireless seat displays located at seats in the cell for receiving the programming from the wireless access point/configurable antenna;
   wherein a passenger logs in to identify placement of the wireless seat display at an identified seat within the plurality of seats, said wireless seat display generating and sending a control protocol message over control and data lines, said control protocol message having a position location number associated with the identified seat; and
   wherein the head end server receives the position location number associated with the identified seat and reads the seat number and re-assigns a communications channel of the wireless seat display located with the identified seat to tune to a best coverage wireless access point/configurable antenna located in the aircraft near the wireless seat display.

2. The cellular wireless IFE system of claim 1 wherein the optimum selected location of the wireless access point/configurable antenna is determined by measure RF power level and fade data at the plurality of seats and the wireless access point/configurable antenna is installed in the optimum selected location and antenna beams are adjusted in accordance with the RF power level and fade data.

3. The cellular wireless IFE system of claim 1 wherein the head end server sends commands to the wireless access point/configurable antenna to make fine beam position adjustments based on a summary computation that considers minimum performance requirements to all cells in the plurality of cells and to maximize a data rate to a cell.

4. The cellular wireless IFE system of claim 1 wherein the plurality of cells is disposed along sides of the passenger cabin at predetermined points within the passenger cabin to provide optimum coverage to the seats within a cell.

5. The cellular wireless IFE system of claim 4 wherein a first group of cells in the plurality of cells operates at a first set of frequencies and a second group of cells in the plurality of cells separated longitudinally from and on a same side of the passenger cabin as the first group of cells repeats the first set of frequencies of the first group of cells.

6. The cellular wireless IFE system of claim 5 wherein a third group of cells in the plurality of cells on an opposite side of the passenger cabin from the first and second group operates at a second set of frequencies and a fourth group of cells in the plurality of cells separated longitudinally from and on a same side of the passenger cabin as the third group of cells repeats the second set of frequencies of the third group.

7. The cellular wireless IFE system of claim 6 wherein the wireless access point/configurable antenna and a seat display antenna have a same polarization and alternating polarization is used between adjacent cells in the plurality of cells.

8. The cellular wireless IFE system of claim 1 wherein the head end server tunes a wireless radio and selects an antenna in the wireless seat display.

9. The cellular wireless IFE system of claim 1 wherein when a capacity of the wireless access point/configurable antenna is exceeded, the cellular wireless IFE system balances a load on the wireless access point/configurable antenna by switching at least one wireless seat display to another wireless access point/configurable antenna using a manual system, whereby a passenger logs in to identify placement of the at least one wireless seat display at an identified seat within the plurality of seats receiving programming from the wireless access point/configurable antenna with exceeded capacity, said at least one wireless seat display generating and sending a control protocol message over control and data lines to switch said at least one wireless seat display at the identified seat said control protocol message having a position location number associated with the identified seat.

10. The cellular wireless IFE system of claim 9 wherein the head end server receives the position location number associated with the identified seat and reads the seat number and re-assigns a communications channel of the at least one wireless seat display location with the identified seat to tune to the other wireless access point/configurable antenna located in the aircraft near the at least one passenger wireless seat display.

11. The cellular wireless IFE system of claim 10 wherein the head end server tunes a wireless radio and selects an antenna in the at least one wireless seat display at the identified seat.

12. The cellular wireless IFE system of claim 1 wherein a scalable architecture is used for data and video programming services whereby each service utilizes a different RF band and each service further utilizes a different wireless access point/configurable antenna.

13. The cellular wireless IFE system of claim 12 wherein a protocol to select and control a wireless access point/configurable antenna includes the selection of the data and programming services.

14. A method of delivering data and programming to passengers in a plurality of seats with a cellular wireless in-flight entertainment (IFE) system in a passenger cabin comprising the steps of:
providing the data and the programming with a head end server to a plurality of cells;
receiving the data and the programming from the head end server with a wireless access point/configurable antenna within a cell in the plurality of cells and disposed at an optimum selected location in the passenger cabin;
transmitting the programming at maximum connectivity to the plurality seats by operating the wireless access point/configurable antenna at a predetermined repeatable frequency with a predetermined radiation pattern and a predetermined polarization;
receiving the programming from the wireless access point/configurable antenna with one or more wireless seat displays located within the cell in the plurality of cells;
exceeding a capacity of a wireless access point/configurable antenna;
logging in by a passenger to identify placement of a wireless seat display at an identified seat receiving programming from the wireless access point/configurable antenna having exceeded capacity;
generating and sending a control protocol message over control and data lines said control protocol message identifying a position location number associated with the identified seat; and
switching the wireless seat display to another wireless access point/configurable antenna to balance a load on the wireless access point/configurable antenna having exceeded capacity.

15. The method of delivering programming to passengers in the plurality of seats with the cellular wireless IFE system of claim 14 further comprising the step of providing optimum coverage to the one or more wireless seat displays within the cell in the plurality of cells disposed along sides of the aircraft cabin at predetermined points within the passenger cabin.

16. The method of delivering programming to passengers in the plurality of seats with the cellular wireless IFE system of claim 14 further comprising the steps of:
operating a first group of cells in the plurality of cells at a first set of frequencies; and
operating a second group of cells in the plurality of cells separated longitudinally from and on a same side of the passenger aircraft cabin as the first group of cells on the first set of frequencies of the first group.

17. The method of delivering programming to passengers in the plurality of seats with the cellular wireless IFE system of claim 16 further comprising the steps of:
operating a third group of cells in the plurality of cells on an opposite side of the passenger cabin from the first and second group at a second set of frequencies; and
operating a fourth group of cells in the plurality of cells separated longitudinally from and a same side of the passenger cabin as the third group of cells on the second set of frequencies of the third group.

18. The method of delivering programming to passengers in the plurality of seats with the cellular wireless IFE system of claim 14 further comprising the steps of operating the wireless access point/configurable antenna and a seat antenna at a same polarization and alternating polarization between adjacent cells in the plurality of cells.

19. The method of delivering programming to passengers in the plurality of seats with the cellular wireless IFE system of claim 14 further comprising the steps of:
determining the optimum selected location of the wireless access point/configurable antenna by measuring RF power level and fade data at the plurality of seats;
installing the wireless access point/configurable antenna in the optimum selected locations; and
adjusting antenna beams in accordance with RF power level and fade data.

20. The method of delivering programming to passengers in the plurality of seats with the cellular wireless IFE system of claim 14 further comprising the steps of:
sending a command to the wireless access point/configurable antenna from the head end server; and
making fine beam position adjustments based on a summary computation that considers minimum performance requirements to all cells in the plurality of cells and to maximize data rate to a cell.

21. The method of delivering programming to passengers in the plurality of seats with the cellular wireless IFE system of claim 14 further comprising the steps of:
logging in by a passenger to identify placement of a wireless seat display at an identified seat within the plurality of seats; and
sending a control protocol message over control and data lines with the wireless seat display said control protocol message having a position location number associated with the identified seat.

22. The method of delivering programming to passengers in the plurality of seats with the cellular wireless IFE system of claim 21 further comprising the steps of:
receiving with the head end server the position location number associated with the identified seat;
reading the seat number; and
re-assigning a communications channel of the wireless seat display located with the identified seat to tune to a best coverage wireless access point/configurable antenna located in the passenger cabin near the wireless seat display.

23. The method of delivering programming to passengers in the plurality of seats with the cellular wireless IFE system of claim 22 further comprising the steps of tuning a wireless radio and selecting an antenna in the wireless seat display at the identified seat with the head end server.

24. The method of delivering programming to passengers in the plurality of seats with the cellular wireless IFE system of claim 14 further comprising the steps of:
receiving the position location number associated with the identified seat with the head end server;
reading the seat number; and
re-assigning a communications channel of the wireless seat display located with the identified seat to tune to a best coverage wireless access point/configurable antenna located near the wireless seat display.

25. The method of delivering programming to passengers in the plurality of seats with the cellular wireless IFE system of claim 24 further comprising the steps of tuning a wireless radio and selecting an antenna in the wireless seat display at the identified seat with the head end server.

26. The method of delivering programming to passengers in the plurality of seats with the cellular wireless IFE system of claim 14 further comprising the step of providing data and video programming services on a different RF band and a different wireless access point/configurable antenna.

27. The method of delivering programming to passengers in the plurality of seats with the cellular wireless IFE system of claim 26 further comprising the steps of selecting and controlling the wireless access point/configurable antenna to select the data and video programming services.

28. A method of delivering data and programming with a cellular wireless in-flight entertainment (IFE) system having a head end server to passengers in a plurality of seats located in a plurality of cells said plurality of cells having a plurality of wireless access points/configurable antennas and a plurality of wireless seat displays therein said method comprising the steps of:
 logging in by a passenger to identify placement of a wireless seat display at a seat within the plurality of seats;
 sending a control protocol message over control and data lines with the wireless seat display said control protocol message having a position location number associated with the seat;
 transmitting the programming to the seat with a wireless access point/configurable antenna;
 receiving the programming from the wireless access point/configurable antenna with the wireless seat display;
 exceeding a capacity of the wireless access point/configurable antenna;
 switching at the wireless seat display to another wireless access point/configurable antenna to balance a load on the wireless access point/configurable antenna using an automatic system;
 producing a ranging signal with a position location system;
 receiving the ranging signal at the wireless seat display; and
 relaying a unique position location back to the head end server from the seat display on a temporarily assigned RF channel through the wireless access point/configurable antenna.

29. The method of delivering programming to passengers with the cellular wireless IFE system of claim 28 further comprising the steps of:
 receiving with the head end server the position location number associated with the seat;
 reading the seat number; and
 re-assigning a communications channel of the wireless seat display located with the seat to tune to a best coverage wireless access point/configurable antenna located in the aircraft near the wireless seat display.

30. The method of delivering programming to passengers with the cellular wireless IFE system of claim 29 further comprising the steps of tuning a wireless radio and selecting an antenna in the wireless seat display with the head end server.

31. The method of delivering programming to passengers in the plurality of seats with the cellular wireless IFE system of claim 28 further comprising the step of assigning the other wireless access point/configurable antenna and RF channel for video programming to the wireless seat display.

32. The method of delivering programming to passengers in the plurality of seats with the cellular wireless IFE system of claim 31 further comprising the step of tuning the seat display to a band on the other wireless access point/configurable antenna.

33. The method of delivering data and programming with the cellular wireless IFE system of claim 28 further comprising the steps of:
 operating a first group of cells in the plurality of cells at a first set of frequencies; and
 operating a second group of cells in the plurality of cells separated longitudinally from and on a same side of the passenger cabin as the first group of cells on the first set of frequencies of the first group.

34. The method of delivering programming to passengers with the cellular wireless IFE system of claim 33 further comprising the steps of:
 operating a third group of cells in the plurality of cells on an opposite side of the passenger cabin from the first and second group at a second set of frequencies; and
 operating a fourth group of cells in the plurality of cells separated longitudinally from and a same side of the passenger cabin as the third group of cells on the second set of frequencies of the third group.

35. The method of delivering programming to passengers with the cellular wireless IFE system of claim 28 further comprising the steps of operating the wireless access point/configurable antenna and a seat antenna at a same polarization and alternating polarization between adjacent cells in the plurality of cells.

36. The method of delivering programming to passengers in the plurality of seats with the cellular wireless IFE system of claim 28 further comprising the step of providing data and video programming services on a different RF band and a different wireless access point/configurable antenna.

37. The method of delivering programming to passengers in the plurality of seats with the cellular wireless IFE system of claim 36 further comprising the steps of selecting and controlling the wireless access point/configurable antenna to select the data and video programming services.

38. The method of delivering programming to passengers in the plurality of seats with the cellular wireless IFE system of claim 28 wherein the step of logging in by a passenger further comprises the steps of:
 producing a ranging signal with a position location system;
 receiving the ranging signal at the wireless seat display;
 relaying a unique position location back to the head end server from the seat display on a temporarily assigned RF channel through the wireless access point/configurable antenna;
 receiving with the head end server the position location number associated with the seat; and
 re-assigning a communications channel of the wireless seat display located with the seat to tune to a best coverage wireless access point/configurable antenna located in the aircraft near the wireless seat display.

* * * * *